(12) United States Patent
Robinson et al.

(10) Patent No.: US 7,747,851 B1
(45) Date of Patent: Jun. 29, 2010

(54) CERTIFICATE DISTRIBUTION VIA LICENSE FILES

(75) Inventors: Richard L. Robinson, Broomfield, CO (US); Robert J. Serkowski, Broomfield, CO (US); William T. Walker, Evergreen, CO (US)

(73) Assignee: Avaya Inc., Basking Ridge, NJ (US)

( * ) Notice: Subject to any disclaimer, the term of this patent is extended or adjusted under 35 U.S.C. 154(b) by 1347 days.

(21) Appl. No.: 10/956,861

(22) Filed: Sep. 30, 2004

(51) Int. Cl.
  *H04L 29/06* (2006.01)
(52) U.S. Cl. .................... 713/156; 713/175; 726/29
(58) Field of Classification Search ......... 713/156–158, 713/165, 175, 180; 726/29; 705/59
  See application file for complete search history.

(56) References Cited

U.S. PATENT DOCUMENTS

| | | | |
|---|---|---|---|
| 4,288,659 A | 9/1981 | Atalla | 178/22.08 |
| 4,405,829 A | 9/1983 | Rivest et al. | |
| 4,780,821 A | 10/1988 | Crossley | |
| 4,811,393 A | 3/1989 | Hazard | 380/21 |
| 4,888,800 A | 12/1989 | Marshall et al. | 380/21 |
| 4,937,863 A | 6/1990 | Robert et al. | |
| 5,005,122 A | 4/1991 | Griffin et al. | |
| 5,023,907 A | 6/1991 | Johnson et al. | |
| 5,157,663 A | 10/1992 | Major et al. | |
| 5,179,591 A | 1/1993 | Hardy et al. | 380/21 |
| 5,204,897 A | 4/1993 | Wyman | 380/4 |
| 5,206,903 A | 4/1993 | Kohler et al. | |
| 5,230,020 A | 7/1993 | Hardy et al. | 380/21 |
| 5,260,999 A | 11/1993 | Wyman | |
| 5,307,481 A | 4/1994 | Shimazaki et al. | |
| 5,329,570 A | 7/1994 | Glassmacher et al. | |
| 5,341,427 A | 8/1994 | Hardy et al. | 380/21 |
| 5,347,580 A | 9/1994 | Molva et al. | |
| 5,386,369 A | 1/1995 | Christiano | |
| 5,390,297 A | 2/1995 | Barber et al. | |
| 5,408,649 A | 4/1995 | Beshears et al. | |

(Continued)

FOREIGN PATENT DOCUMENTS

EP  1071253  1/2001

(Continued)

OTHER PUBLICATIONS

Java Skyline: Java Servlet/Server Headline News, Oct. through Dec. 1998, pp. 1-3.

(Continued)

*Primary Examiner*—David Garcia Cervetti
(74) *Attorney, Agent, or Firm*—Sheridan Ross P.C.

(57) ABSTRACT

A system for licensing a computational component in a distributed processing network is provided. The system includes a licensing provider 100 that is spatially remote from the computational component 154 and is operable to: (a) assign a private and public key pair to the computational component 154; (b) create a digital certificate 308 for the computational component 154, the digital certificate 308 being signed with a private key of the licensing provider 100, the licensing provider's private key being different from the computational component's private key 312; (c) create a license file 176 to be installed on the computational component; and (d) transmit the license file 176 and the computational component's signed digital certificate 308 and private key 312 to the computational component 154.

30 Claims, 4 Drawing Sheets

U.S. PATENT DOCUMENTS

| | | | |
|---|---|---|---|
| 5,448,639 A | 9/1995 | Arazi | |
| 5,553,143 A | 9/1996 | Ross et al. | |
| 5,563,946 A | 10/1996 | Cooper et al. | |
| 5,579,222 A | 11/1996 | Bains et al. | |
| 5,646,992 A | 7/1997 | Subler et al. | |
| 5,671,412 A | 9/1997 | Christiano | |
| 5,673,315 A | 9/1997 | Wolf | |
| 5,699,431 A | 12/1997 | Van Oorschot et al. | 380/30 |
| 5,708,709 A | 1/1998 | Rose | 705/59 |
| 5,717,604 A | 2/1998 | Wiggins | 709/229 |
| 5,724,428 A | 3/1998 | Rivest | |
| 5,742,757 A | 4/1998 | Hamadani et al. | |
| 5,745,569 A | 4/1998 | Moskowitz et al. | |
| 5,745,576 A | 4/1998 | Abraham et al. | 380/25 |
| 5,745,879 A | 4/1998 | Wyman | 705/1 |
| 5,754,761 A | 5/1998 | Willsey | |
| 5,758,068 A | 5/1998 | Brandt et al. | 726/27 |
| 5,758,069 A | 5/1998 | Olsen | |
| 5,790,074 A | 8/1998 | Rangedahl et al. | 342/357.13 |
| 5,790,664 A | 8/1998 | Coley et al. | 380/4 |
| 5,796,941 A | 8/1998 | Lita | |
| 5,828,747 A | 10/1998 | Fisher et al. | |
| 5,835,600 A | 11/1998 | Rivest | |
| 5,864,620 A * | 1/1999 | Pettitt | 705/54 |
| 5,905,793 A | 5/1999 | Flockhart et al. | |
| 5,905,860 A * | 5/1999 | Olsen et al. | 726/27 |
| 5,935,243 A | 8/1999 | Hasebe et al. | |
| 5,940,504 A | 8/1999 | Griswold | 705/59 |
| 5,956,505 A | 9/1999 | Manduley | |
| 5,956,716 A | 9/1999 | Kenner et al. | |
| 5,960,085 A | 9/1999 | de la Huerga | |
| 5,978,565 A | 11/1999 | Ohran et al. | |
| 5,982,873 A | 11/1999 | Flockhart et al. | |
| 5,995,625 A * | 11/1999 | Sudia et al. | 705/51 |
| 6,006,016 A | 12/1999 | Faigon et al. | |
| 6,009,401 A * | 12/1999 | Horstmann | 705/1 |
| 6,023,763 A | 2/2000 | Grumstrup et al. | |
| 6,023,766 A | 2/2000 | Yamamura | |
| 6,047,242 A * | 4/2000 | Benson | 702/35 |
| 6,067,621 A | 5/2000 | Yu et al. | |
| 6,108,703 A | 8/2000 | Leighton et al. | 709/226 |
| 6,128,389 A | 10/2000 | Chan et al. | |
| 6,134,660 A | 10/2000 | Boneh et al. | |
| 6,148,415 A | 11/2000 | Kobayashi et al. | |
| 6,163,607 A | 12/2000 | Bogart et al. | |
| 6,173,053 B1 | 1/2001 | Bogart et al. | |
| 6,178,511 B1 | 1/2001 | Cohen et al. | |
| 6,189,146 B1 * | 2/2001 | Misra et al. | 717/177 |
| 6,192,122 B1 | 2/2001 | Flockhart et al. | |
| 6,212,635 B1 | 4/2001 | Reardon | |
| 6,219,652 B1 * | 4/2001 | Carter et al. | 705/59 |
| 6,223,291 B1 * | 4/2001 | Puhl et al. | 726/28 |
| 6,246,871 B1 | 6/2001 | Ala-Laurila | |
| 6,314,565 B1 | 11/2001 | Kenner et al. | |
| 6,343,280 B2 | 1/2002 | Clark | |
| 6,360,320 B1 * | 3/2002 | Ishiguro et al. | 713/164 |
| 6,381,747 B1 | 4/2002 | Wonfor et al. | |
| 6,414,595 B1 | 7/2002 | Scrandis et al. | |
| 6,421,726 B1 | 7/2002 | Kenner et al. | |
| 6,442,708 B1 | 8/2002 | Dierauer et al. | |
| 6,463,534 B1 * | 10/2002 | Geiger et al. | 713/168 |
| 6,502,079 B1 | 12/2002 | Ball et al. | 705/59 |
| 6,513,117 B2 * | 1/2003 | Tarpenning et al. | 713/156 |
| 6,513,121 B1 | 1/2003 | Serkowski | 713/201 |
| 6,539,481 B1 | 3/2003 | Takahashi et al. | |
| 6,557,105 B1 * | 4/2003 | Tardo et al. | 713/193 |
| 6,574,612 B1 | 6/2003 | Baratti et al. | |
| 6,584,454 B1 | 6/2003 | Hummel et al. | |
| 6,615,347 B1 * | 9/2003 | de Silva et al. | 713/156 |
| 6,640,305 B2 | 10/2003 | Kocher et al. | |
| 6,654,888 B1 | 11/2003 | Cooper et al. | |
| 6,675,208 B1 | 1/2004 | Rai et al. | |
| 6,697,945 B2 * | 2/2004 | Ishiguro et al. | 713/171 |
| 6,760,324 B1 | 7/2004 | Scott et al. | |
| 6,765,492 B2 | 7/2004 | Harris | 340/686.6 |
| 6,769,063 B1 | 7/2004 | Kanda et al. | |
| 6,772,133 B1 | 8/2004 | Kambayashi et al. | |
| 6,775,782 B1 * | 8/2004 | Buros et al. | 726/2 |
| 6,778,820 B2 | 8/2004 | Tendler | 455/414.2 |
| 6,785,726 B1 | 8/2004 | Freeman et al. | |
| 6,795,941 B2 | 9/2004 | Nickels | |
| 6,816,842 B1 | 11/2004 | Singh et al. | |
| 6,826,606 B2 | 11/2004 | Freeman et al. | 709/223 |
| 6,842,896 B1 | 1/2005 | Redding et al. | |
| 6,850,958 B2 | 2/2005 | Wakabayashi | |
| 6,854,010 B1 | 2/2005 | Christian et al. | |
| 6,868,403 B1 * | 3/2005 | Wiser et al. | 705/51 |
| 6,876,984 B2 * | 4/2005 | Tadayon et al. | 705/51 |
| 6,883,095 B2 | 4/2005 | Sandhu et al. | |
| 6,889,212 B1 * | 5/2005 | Wang et al. | 705/59 |
| 6,901,386 B1 | 5/2005 | Dedrick et al. | |
| 6,904,523 B2 * | 6/2005 | Bialick et al. | 713/156 |
| 6,920,567 B1 | 7/2005 | Doherty et al. | 726/22 |
| 6,928,166 B2 | 8/2005 | Yoshizawa | |
| 6,928,558 B1 | 8/2005 | Allahwerdi et al. | |
| 6,934,463 B2 * | 8/2005 | Ishiguro et al. | 386/94 |
| 6,934,848 B1 | 8/2005 | King et al. | |
| 6,941,283 B2 | 9/2005 | Kambayashi et al. | |
| 6,957,344 B1 * | 10/2005 | Goldshlag et al. | 713/194 |
| 6,959,291 B1 | 10/2005 | Armstrong et al. | |
| 6,961,858 B2 * | 11/2005 | Fransdonk | 726/29 |
| 6,968,384 B1 | 11/2005 | Redding et al. | |
| 6,973,444 B1 * | 12/2005 | Blinn et al. | 705/51 |
| 6,976,164 B1 | 12/2005 | King et al. | |
| 6,981,222 B2 | 12/2005 | Rush et al. | |
| 7,032,113 B2 | 4/2006 | Pendlebury | |
| 7,035,918 B1 | 4/2006 | Redding et al. | |
| 7,065,214 B2 * | 6/2006 | Ishiguro et al. | 380/268 |
| 7,073,063 B2 * | 7/2006 | Peinado | 713/171 |
| 7,085,382 B2 | 8/2006 | Terao et al. | |
| 7,096,469 B1 | 8/2006 | Kubala et al. | |
| 7,100,200 B2 | 8/2006 | Pope et al. | |
| 7,124,304 B2 * | 10/2006 | Bel et al. | 713/193 |
| 7,146,340 B1 * | 12/2006 | Musson | 705/57 |
| 7,149,806 B2 | 12/2006 | Perkins et al. | |
| 7,152,245 B2 * | 12/2006 | Dublish et al. | 726/29 |
| 7,171,662 B1 * | 1/2007 | Misra et al. | 717/177 |
| 7,185,195 B2 * | 2/2007 | Hug et al. | 713/156 |
| 7,206,936 B2 | 4/2007 | Aull et al. | |
| 7,228,426 B2 | 6/2007 | Sinha et al. | |
| 7,302,703 B2 | 11/2007 | Burns | |
| 7,308,717 B2 * | 12/2007 | Koved et al. | 726/27 |
| 7,313,828 B2 * | 12/2007 | Holopainen | 726/29 |
| 7,318,236 B2 * | 1/2008 | DeMello et al. | 726/26 |
| 7,336,791 B2 * | 2/2008 | Ishiguro | 380/278 |
| 7,356,692 B2 * | 4/2008 | Bialick et al. | 713/156 |
| 7,382,881 B2 | 6/2008 | Uusitalo et al. | |
| 7,383,205 B1 * | 6/2008 | Peinado et al. | 705/26 |
| 7,415,729 B2 * | 8/2008 | Ukeda et al. | 726/26 |
| 7,545,931 B2 | 6/2009 | Dillaway | |
| 7,549,172 B2 * | 6/2009 | Tokutani et al. | 726/27 |
| 7,552,166 B2 | 6/2009 | Chack | |
| 7,565,325 B2 | 7/2009 | Lenard et al. | |
| 2001/0001268 A1 | 5/2001 | Menon et al. | |
| 2001/0013024 A1 * | 8/2001 | Takahashi et al. | 705/59 |
| 2001/0034846 A1 | 10/2001 | Beery | |
| 2001/0044897 A1 * | 11/2001 | Ishiguro et al. | 713/171 |
| 2002/0001302 A1 | 1/2002 | Pickett | 370/352 |
| 2002/0007454 A1 * | 1/2002 | Tarpenning et al. | 713/156 |
| 2002/0007456 A1 * | 1/2002 | Peinado et al. | 713/164 |
| 2002/0013772 A1 * | 1/2002 | Peinado | 705/51 |
| 2002/0017977 A1 | 2/2002 | Wall | 340/5.28 |
| 2002/0038422 A1 | 3/2002 | Suwamoto et al. | |
| 2002/0052939 A1 | 5/2002 | Lee | |

| | | | |
|---|---|---|---|
| 2002/0069361 A1* | 6/2002 | Watanabe et al. ............ 713/185 |
| 2002/0083003 A1 | 6/2002 | Halliday ...................... 713/52 |
| 2002/0083319 A1* | 6/2002 | Ishiguro et al. ............. 713/168 |
| 2002/0087892 A1 | 7/2002 | Imazu |
| 2002/0104006 A1 | 8/2002 | Boate et al. |
| 2002/0107809 A1 | 8/2002 | Biddle et al. |
| 2002/0112186 A1 | 8/2002 | Ford et al. |
| 2002/0116340 A1* | 8/2002 | Hellberg et al. ............... 705/59 |
| 2002/0125886 A1 | 9/2002 | Bates et al. ................. 324/307 |
| 2002/0138441 A1* | 9/2002 | Lopatic ....................... 705/59 |
| 2002/0154777 A1 | 10/2002 | Candelore ................... 380/258 |
| 2002/0164025 A1 | 11/2002 | Raiz et al. ................... 380/231 |
| 2002/0169625 A1 | 11/2002 | Yang et al. |
| 2002/0169725 A1 | 11/2002 | Eng |
| 2002/0174356 A1 | 11/2002 | Padole et al. ................ 713/200 |
| 2002/0176404 A1 | 11/2002 | Girard ........................ 370/352 |
| 2002/0184508 A1* | 12/2002 | Bialick et al. ............... 713/182 |
| 2002/0188656 A1 | 12/2002 | Patton et al. |
| 2002/0188704 A1 | 12/2002 | Gold |
| 2002/0194475 A1* | 12/2002 | Ishiguro et al. ............. 713/168 |
| 2002/0199105 A1* | 12/2002 | Ishiguro et al. ............. 713/168 |
| 2003/0005427 A1 | 1/2003 | Herrero ...................... 717/178 |
| 2003/0013411 A1 | 1/2003 | Uchiyama |
| 2003/0018491 A1 | 1/2003 | Nakahara et al. |
| 2003/0018582 A1 | 1/2003 | Yaacovi |
| 2003/0023564 A1* | 1/2003 | Padhye et al. ................ 705/54 |
| 2003/0046566 A1* | 3/2003 | Holopainen ................. 713/193 |
| 2003/0055749 A1 | 3/2003 | Carmody et al. |
| 2003/0084306 A1 | 5/2003 | Abburi et al. |
| 2003/0095542 A1 | 5/2003 | Chang et al. |
| 2003/0144959 A1 | 7/2003 | Makita |
| 2003/0149670 A1* | 8/2003 | Cronce ........................ 705/59 |
| 2003/0149874 A1 | 8/2003 | Balfanz et al. |
| 2003/0156719 A1* | 8/2003 | Cronce ........................ 380/256 |
| 2003/0159033 A1* | 8/2003 | Ishiguro ...................... 713/156 |
| 2003/0159070 A1 | 8/2003 | Mayer et al. |
| 2003/0163428 A1 | 8/2003 | Schneck et al. |
| 2003/0172035 A1 | 9/2003 | Cronce et al. |
| 2003/0177393 A1* | 9/2003 | Ishiguro ...................... 713/201 |
| 2003/0191936 A1 | 10/2003 | Kawatsura et al. |
| 2003/0208449 A1 | 11/2003 | Diao |
| 2003/0233547 A1 | 12/2003 | Gaston et al. |
| 2004/0010440 A1 | 1/2004 | Lenard et al. |
| 2004/0010469 A1 | 1/2004 | Lenard et al. |
| 2004/0044629 A1 | 3/2004 | Rhodes et al. ................ 705/59 |
| 2004/0044630 A1 | 3/2004 | Walker et al. ................ 705/59 |
| 2004/0044631 A1 | 3/2004 | Walker et al. ............... 713/200 |
| 2004/0044901 A1 | 3/2004 | Serkowski et al. .......... 713/200 |
| 2004/0047354 A1 | 3/2004 | Slater et al. |
| 2004/0054909 A1 | 3/2004 | Serkowski et al. .......... 713/200 |
| 2004/0054930 A1 | 3/2004 | Walker et al. ................ 705/59 |
| 2004/0073517 A1 | 4/2004 | Zunke et al. ................. 705/59 |
| 2004/0078339 A1 | 4/2004 | Goringe et al. ............... 705/59 |
| 2004/0088541 A1* | 5/2004 | Messerges et al. .......... 713/156 |
| 2004/0103011 A1* | 5/2004 | Hatano et al. .................. 705/4 |
| 2004/0103324 A1 | 5/2004 | Band |
| 2004/0127196 A1* | 7/2004 | Dabbish et al. ............. 455/411 |
| 2004/0128395 A1* | 7/2004 | Miyazaki ..................... 709/229 |
| 2004/0128551 A1 | 7/2004 | Walker et al. ............... 713/201 |
| 2004/0133794 A1 | 7/2004 | Kocher et al. |
| 2004/0162998 A1 | 8/2004 | Tuomi et al. |
| 2004/0166878 A1 | 8/2004 | Erskine et al. ............. 455/456.1 |
| 2004/0172367 A1 | 9/2004 | Chavez ........................ 705/59 |
| 2004/0181695 A1 | 9/2004 | Walker ........................ 713/202 |
| 2004/0181696 A1 | 9/2004 | Walker ........................ 713/202 |
| 2004/0199760 A1 | 10/2004 | Mazza et al. ................ 713/150 |
| 2004/0249763 A1 | 12/2004 | Vardi |
| 2004/0260589 A1 | 12/2004 | Varadarajan et al. |
| 2004/0268120 A1* | 12/2004 | Mirtal et al. ................. 713/156 |
| 2005/0005098 A1* | 1/2005 | Michaelis et al. ........... 713/156 |
| 2005/0038753 A1* | 2/2005 | Yen et al. ..................... 705/59 |
| 2005/0076204 A1* | 4/2005 | Thornton et al. ............ 713/156 |
| 2005/0086174 A1 | 4/2005 | Eng |
| 2005/0091507 A1 | 4/2005 | Lee et al. |
| 2005/0144437 A1* | 6/2005 | Ransom et al. ............. 713/151 |
| 2005/0154877 A1 | 7/2005 | Trench |
| 2005/0185792 A1* | 8/2005 | Tokutani et al. ................ 380/30 |
| 2005/0198510 A1* | 9/2005 | Robert et al. ................ 713/175 |
| 2005/0202830 A1 | 9/2005 | Sudit ........................ 455/456.1 |
| 2005/0229004 A1* | 10/2005 | Callaghan ................... 713/185 |
| 2005/0246098 A1 | 11/2005 | Bergstrom et al. .......... 701/213 |
| 2005/0289072 A1 | 12/2005 | Sabharwal |
| 2006/0021068 A1 | 1/2006 | Xu et al. |
| 2006/0026105 A1* | 2/2006 | Endoh ......................... 705/59 |
| 2006/0036554 A1* | 2/2006 | Schrock et al. ............... 705/75 |
| 2006/0036894 A1 | 2/2006 | Bauer et al. |
| 2006/0064582 A1* | 3/2006 | Teal et al. ................... 713/156 |
| 2006/0089912 A1 | 4/2006 | Spagna et al. |
| 2006/0178953 A1 | 8/2006 | Aggarwal et al. |
| 2006/0242083 A1 | 10/2006 | Chavez |
| 2006/0294010 A1 | 12/2006 | Kim et al. |
| 2007/0033419 A1 | 2/2007 | Kocher et al. |
| 2007/0107067 A1 | 5/2007 | Fountian |
| 2007/0219917 A1 | 9/2007 | Liu et al. |
| 2008/0052295 A1 | 2/2008 | Walker et al. |
| 2008/0082449 A1* | 4/2008 | Wilkinson et al. ............ 705/59 |
| 2008/0141242 A1 | 6/2008 | Shapiro |

FOREIGN PATENT DOCUMENTS

| | | |
|---|---|---|
| EP | 1562378 | 8/2005 |
| JP | 2006/085481 | 3/2006 |

OTHER PUBLICATIONS

Background of the Invention for the above-captioned patent application (previously provided).
U.S. Appl. No. 11/222,997, filed Sep. 8, 2005, Rao.
A. Menezes, P. van Oorschot and S. Vanstone, Handbook of Applied Cryptography, cr8523_01[1].pdf, Chapter 1, 48 pages.
A. Menezes, P. van Oorschot and S. Vanstone, Handbook of Applied Cryptography, cr8523_1 0[1].pdf, Chapter 10, 40 pages.
A. Menezes, P. van Oorschot and S. Vanstone, Handbook of Applied Cryptography, cr8523_12[1].pdf, Chapter 12, 53 pages.
FLEXlm End Users Guide, Version 9.2. Jul. 2003. Published by Macrovision. 166 pages.
Sun Microsystems, Inc. Java Cryptography Architecture API Specification & Reference, Aug. 4, 2002, 56 pages.
Bowman, Louise, Smart Cards Go Corporate (Andrew Phillips from Dataquest forecasts the number of smart cards corporations will buy to increase to 91.9 mil by 2004 from a total of 230,000 in 2000), Oct. 2000, Thomson Media, Oct. 2000, pp. 1-6.
Kuchinskas, Susan, Keeping content safe is a big job and everyone has to do it: the security of its corporate content can make or break Topps. (Topps employs security consultant to watch network traffic), Jul. 2003, 2003 Online, Inc., Jul. 2003, pp. 1-5.
Multos Fights On, Jan. 2004, Thomson Media, Inc., Jan. 2004, pp. 1-7.
ADTech Engineering, "IP Phone SI-160 User Manual (SCCP releases)," Version 1.2 (2002), pp. 1-20.
Articsoft Limited, "Public Key Infrastructure (PKI) FAQs" (Feb. 2, 2003), available at http://www.articsoft.com/wp_pki_faq.htm, 5 pages.
ARSYS, "Public Key Infrastructure," (Feb. 4, 2001), available at http://www.transactiontrust.com/technicaindex.html, 4 pages.
Clarke, Roger, "Centrelink Smart Card Technical Issues Starter Kit Chapter 7" (Apr. 8, 1998) at http://www.anu.edu.au/people/Roger.Clarke/DV/SCTISK.html, pp. 1-3.
Datakey, "Securing a Virtual Private Network with Smart Card Technology" available at www.datakey.com, pp. 1-8.
"Digital Cinema Key Management Messages," Draft 1 (Aug. 8, 2002), pp. 1-9.
Discerning the Times Digest and Newsbytes, "Global Control of All Buying and Selling Now Possible," vol. 1, Iss. 1 (Jan. 2000), available at http://www.discerningtoday.org/members/Digest/2000Digest/January/Global%20Control.htm, 2 pages.
U.S. Appl. No. 10/811,412, filed Mar. 25, 2004, Walker.

U.S. Appl. No. 10/947,418, filed Sep. 21, 2004, Gilman et al.
Info Merchant Store, "VeriFone 2000, MS/DUKPT/STD Pin Pad, News" (printed Feb. 17, 2007), available at http://www.merchantamerica.com/creditcardterminals/index.php?ba=product_enlarge&product=9632, 1 page.
Griswold, Robert S., "Get Smart: The Coming Revolution of Smart Cards," *Journal of Property Management* (May/Jun. 1997), 5 pages.
Entrust Inc., "Entrust Authority Security Manager," (printed Aug. 13, 2004), available at http://www.entrust.com/authority/manager/index.htm, 23 pages.
Infosec Engineering, "Building a Corporate Public Key Infrastructure" (1999), available at http://www.infoseceng.com/corppki.htm, 20 pages.
LockStream Corporation, "Catalyst DRM Service Platform Architecture," Vers. 1.0 (Nov. 2003), pp. 1-28.
LockStream Corporation, "Catalyst DRM Service Platform" (printed Aug. 13, 2004), available at http://www.lockstream.com/products_spcm.php, 1 page.
LockStream Corporation, "Lockstream KeyDRM" (printed Aug. 13, 2004), available at http://www.lockstream.com/products_lgm.php, 2 pages.
LockStream Corporation, "Lockstream OMA 1.0 DRM Client" (printed Aug. 13, 2004), available at http://www.lockstream.com/products_sprm.php, 2 pages.
Microsoft Corporation, "Accessing a Smart Card" (Aug. 2002), available at http://msdn.microsoft.com/library/en-us/security/security/accessing_a_smart_card.asp, p. 1.
Microsoft Corporation, "Base Service Providers" (Aug. 2002), available at http://msdn.microsoft.com/library/en-us/security/security/base_service_providers.asp, p. 1.
Microsoft Corporation, "Building an ISO7816-4 APDU Command" (Aug. 2002), available at http://msdn.microsoft.com/library/en-us/security/security/building_an_iso7816_4_apdu_command.asp, pp. 1-2.
Microsoft Corporation, "Introducing Smart Cards to the System" (Aug. 2002), available at http://msdn.microsoft.com/library/en-us/security/security/introducing_smart_cards_to_the_system.asp, p. 1.
Microsoft Corporation, "Primary Service Provider" (Aug. 2002), available at http://msdn.microsoft.com/library/en-us/security/security/primary_service_provider.asp, p. 1.
Microsoft Corporation, "Smart Card Authentication" (Aug. 2002), available at http://msdn.microsoft.com/library/en-us/security/security/smart_card_authentication.asp, pp. 1-2.
Microsoft Corporation, "Smart Card Interfaces" (Aug. 2002), available at http://msdn.microsoft.com/library/en-us/security/security/smart_card_interfaces.asp, p. 1.
Microsoft Corporation, "Smart Card Resource Manager" (Aug. 2002), available at http://msdn.microsoft.com/library/en-us/security/security/smart_card_resource_manager.asp, p. 1.
Microsoft Corporation, "Smart Card User Interface" (Aug. 2002), available at http://msdn.microsoft.com/library/en-us/security/security/smart_card_user_interface.asp, p. 1.
Microsoft Corporation, "Smart Card Service Providers" (Aug. 2002), available at http://msdn.microsoft.com/library/en-us/security/security/smart_card_service_providers.asp, p. 1.
Microsoft Corporation, "Vendor Wrapper Service Provider" (Aug. 2002), available at http://msdn.microsoft.com/library/en-us/security/security/vendor_wrapper_service_provider.asp, pp. 1-2.
MIT Laboratory for Computer Science, "The Cricket Indoor Location System," An NMS Project (printed Jul. 31, 2002), available at http://nms.lcs.mit.edu/projects/cricket/, 5 pages.
Motorola Press Release, "ERG Motorola Alliance Receives Award for Smart Card" (Jun. 6, 2000), available at http://www.motorola.com/LMPS/pressreleases/page888.htm, 3 pages.
NEC Infrontia Corporation Press Release, "Establishment of "SmartCardInfrontia" solutions for 'IC card'," (Mar. 13, 2002), 4 pages.
Novell®, "Certificate Server: Public Key Instrastructure," White Paper (1999), pp. 1-10.
SecurityConfig, Back Up Your Encrypting File System Private Key in Windows 2000 Download (Printed Aug. 13, 2004), available at http://www.securityconfig.com/software/alerts/back_up_your_encrypting_file_system_private_key_in_windows_2000.html, 2 pages.
Smart Card Alliance Industry News, "Cubic Introduces New Mobile Ticketing Machine" (Jul. 3, 2003), available at http://www.smartcardalliance.org/industry_news/industry_news_item.cfm?itemID=852, 2 pages.
Smart Card Alliance Industry News, "Cubic Corp. Introduces New National Security and Homeland Defense" (Sep. 9, 2002), available at http://www.smartcardalliance.org/industry_news/industry_news_item.cfm?itemID=310, 2 pages.
SSH Communications Security Corp., "Enabling Virtual Public Networks with Public Key Infrastructure," White Paper (Jan. 2004), pp. 1-9.
Streetman, Kibbee D. et al., "Public Key Infrastructure: Resources, Requirements and Recommendations," ATI IPT Special Report 00-06 (Apr. 2000), pp. 1-45.
Sun Developer Network, "Smart Card Overview," Sun Microsystems, Inc. (1994-2004), available at http://java.sun.com/products/javacard/smartcards.html, 2 pages.
NetLingo Dictionary of Internet Words, "Smart Card" (1995-0004), available at http://www.netlingo.com/lookup.cfm?term=smart+card, 2 pages.
Rankl, Wolfgang, "Smart Card Handbook," (Jun. 13, 2004), available at http://www.wrankl.de/SCH/SCH.html, 8 pages.
Russinovich, Mark, "Inside Encrypting File System, Part 1," *Windows & .NET Magazine* (Jun. 1999), available at http://www.winntmag.com/Articles/Index.cfm?ArticleID=5387&Key=Internals, 4 pages.
Russinovich, Mark, "Inside Encrypting File System, Part 2," *Windows & .NET Magazine* (Jul. 1999), available at http://www.winntmag.com/Articles/Index.cfm?ArticleID=5592&Key=Internals, 5 pages.
VeriFone Inc., "VeriFone Payment Solutions: Point-of-Sale PINpads" (1997-2004), available at http://www.verifone.com/products/printers_peripherals/html/pinpad_family.html, 1 page.
Whatis.com Target Search™, "PKI" (Jan. 13, 2004), available at http://whatis.techtarget.com/definition/0,289893,sid9_gci214299,00.html, 4 pages.
U.S. Appl. No. 10/775,498, Gilman.
U.S. Appl. No. 11/051,316, Mazza.
MATLAB Installation Guide for PC, Release 11, The MathWorks Inc, 1999.
Microsoft Systems Management Server 2.0 Resource Guide, Microsoft Press, 1999. ISBN 0-7356-0583-1.
Windows NT Server 4. Garms, Jason. SAMS Publishing, 1998. ISBN 0-672-31249-2.
"RightNow Technologies and MarketFirst Partnership Delivers Complete E-Marketing Solution", PR Newsire, Aug. 14, 2001, p. 1.
Stevens, W. Richard. Advanced Programming in the UNIX Environment. Addison-Wesley, 1993. Front matter, back matter, and pp. 18-21 included.
White, Ron. How Computers Work, Millennium Edition. Que Publishing, 1999. Front Matter, Back matter, and pp. 4-13,36-37,106-111, and 122-133 included.
US 5,742,747, 04/1998, Hamadani et al. (withdrawn)

* cited by examiner

CERTIFICATE DISTRIBUTION VIA LICENSE FILES

CROSS REFERENCE TO RELATED APPLICATION

Cross reference is made to U.S. patent application Ser. Nos. 10/231,957, filed Aug. 30, 2002, now U.S. Pat. No. 7,216,363, entitled "Licensing Duplicated Systems"; 10/232,507, filed Aug. 30, 2002, now U.S. Pat. No. 7,228,567, entitled "License File Serial Number Tracking"; 10/232,508, filed Aug. 30, 2002, entitled "License Modes in Call Processing"; 10/231,999, filed Aug. 30, 2002, entitled "Flexible License File Feature Controls"; 10/232,906, filed Aug. 30, 2002, entitled "Remote Feature Activator Feature Extraction"; 10/232,647, filed Aug. 30, 2002, entitled "Software Licensing for Spare Processors"; 10/348,107, filed Jan. 20, 2003, entitled "Remote Feature Activation Authentication File System"; 10/387,182, filed Mar. 11, 2003, entitled "Temporary Password Login"; 10/811,412, filed Mar. 25, 2004, now U.S. Pat. No. 7,272,500, entitled "Global Positioning System Hardware Key for Software Licenses"; 11/051,316, filed Feb. 2, 2005, entitled "Generation of Persistent Licenses in a Customer Environment"; and 10/947,418, filed Sep. 21, 2004, entitled "Secure Installation Activation", each of which is incorporated herein by this reference.

FIELD OF THE INVENTION

The invention relates generally to software and/or hardware and particularly to the application of cryptographic algorithms to software and/or hardware licensing.

BACKGROUND OF THE INVENTION

Distributed software systems that operate over an open network, particularly a Wide Area Network such as the Internet, often have the need for secure communications over the network and authentication between system elements to prevent spoofing and other security breaches. Various protocols have been used to provide such security. Exemplary protocols include the Secure Sockets Layer or SSL, Transport Layer Security or TLS, Secure-HTTP, and IP Security or IPSEC.

Instrumental in these protocols are cryptographic mechanisms. Two primary cryptographic mechanisms are secret key and public key cryptography. Secret key is a type of symmetric encryption in which both parties know and use the same or shared secret key to encrypt and decrypt communications. Encryption algorithms, or ciphers, based on the secret key, mathematically transform or encrypt the plain text in the message into cipher text. The same key and algorithm are used by the other party to decrypt the cipher text. Public key cryptography is a type of asymmetric encryption that uses pairs of different keys, one for encryption and one for decryption. One of the keys or private key is kept secret by a party and the other key or public key is provided freely to other parties. When plain text is converted into ciphertext or encrypted using the private key, it may be converted back into plain text only using the public key and vice versa. The Rivest-Shamir-Adleman or RSA algorithm is one of the most widely used public key algorithms.

The SSL protocol uses the Public Key Infrastructure or PKI, a form of public key cryptography, to secure communications over otherwise unsecured networks. RSA, together with the X.509 standard for digital certificates, form the basis of PKI. A certificate 200 according to the X.509 standard is shown in FIG. 2. The standard portion 202 of X.509 includes the version 204 (which indicates the particular version of the X.509 standard), serial number 208 (which is assigned by the certificate authority and uniquely identifies the certificate), signature algorithm 212 (which identifies the algorithm used to in the digital signature), issuer or signer 216 of the certificate (which identifies the certificate authority that issued the certificate), period of validity 220 for the certificate (which identifies both the earliest and latest times that the certificate is valid), the subject or owner 224 of the public key, and the public key 228 of the owner of the certificate. Extensions 232 provide a location for issuers to add their own private information to the certificate. It can include authority and subject key identifiers, key usage, private key usage period, and a list of permitted use and restrictions on usage for the certificate. The certificate 200 further includes the digital signature field 236 (encrypted using the private key of an issuing entity). The digital signature field includes the signature algorithm identifier 212, a secure hash of the other fields in the certificate, and a digital signature of that hash. When a certificate has been issued and signed by the same entity, that certificate is known as a self-signed certificate or a root certificate. In a certificate chain or chain of trust, a root certificate is at always at the top of the chain and is used to validate each of the other lower certificates in the chain. A trusted third-party, such as Verisign™, that issues digital certificates used to create digital signatures and public/private key pairs is known as a certificate authority or CA. As can be seen from the foregoing, to implement PKI each system element in the distributed network requires a unique digital certificate and associated private key.

Providing each system element with a unique certificate can be achieved by secure communications between the system element and a certificate authority. In this approach, the system element generates a public/private key set and makes a certificate request to the certificate authority. Secure distribution of the private key is not an issue because no distribution is needed (the private key is generated on the target system element). However, this approach is not practical in many cases, since it requires direct communication between the system element and a certificate authority. This approach also presents security issues, since the certificate request sent from a given system element can be difficult to validate. If the certificate is granted without sufficient validation, the security that the certificate provides is compromised. More thorough validation is time consuming and potentially expensive.

SUMMARY OF THE INVENTION

These and other needs are addressed by the various embodiments and configurations of the present invention. The present invention is directed generally to the use of a shared or common file, such as a license file, to distribute cryptographic information, such as a digital certificate and private key.

In a first embodiment of the present invention, a process for licensing a computational component or system elements (which can be hardware and/or software) in a distributed processing network includes the steps of:

(a) the licensing provider assigning a private and public key pair to the computational component;

(b) the licensing provider creating a digital certificate for the computational component, the digital certificate being signed with a private key of the licensing provider, the licensing provider's private key being different from the computational component's private key;

(c) the licensing provider creating a license file to be installed on the computational component; and (d) the licensing provider transmitting the license file and the computational component's signed digital certificate and/or private key to the computational component. This embodiment can provide certificate provisioning when the computational component has no network connectivity to the certificate authority, generate certificates in advance for known network identities, and can assign certificates to known network identities. When the license file is installed on the computational component, the unique certificate and/or private key are also installed. The process is particularly useful when each computational component to be licensed requires a unique or nearly unique license file.

The process can effectively and securely distribute PKI information to the computational component even when the licensing provider and computational component are located remotely from one another in the network. For example, the licensing provider and the computational component can be connected by a wide area network, such as the Internet.

In one configuration, the PKI information is included in or appended to the license file. For systems requiring multiple certificates in a single license file, the solution provides a mechanism that can ensure unique and secure distribution of the certificates to various elements of the system.

In one configuration, the license provider installs a single license file on a licensed server in a customer's enterprise network, and the licensed server in turn supports licensing of multiple computational components on the network. In such systems, the various system elements needing software licenses make license requests (e.g., requests for permission to run a given set of software) to the licensed server, which in turn grants permission, provided that the request is allowed within the bounds of the software license. Before the present invention if certificates were to be provided via the license file, a single license file must contain multiple certificates because a single license file supports multiple computational components. This presents a problem of how to uniquely (a given computational component always gets the same certificate) and securely (no compromise of the private key) distribute certificates and associated private keys from the licensed server to the remotely located computational components.

When the single license file for the enterprise is generated, information in the license file defines the maximum number of computational components. This information is used to determine the number of certificates to be included in the license file (one is typically included for each licensed computational component plus a certificate for the licensed server). The license provider creates the required number of certificates and includes them in the license file. Each certificate commonly includes the enterprise customer's license identifier that uniquely identifies each customer. Also included in the license file is the private key associated with each certificate. The private keys are encrypted in the license file to prevent the keys from being discovered. When the license file with certificates is installed on the license server, the license server extracts its certificate and private key for use in authentication and secure communications with other computational components.

To address the concern of unique (a given computational component always receiving the same certificate) and secure (no compromise of the private key) distribution, each valid computational component that is entitled to a certificate is administered on the license server by the customer. The administered data for each computational component can include the serial number, MAC address, IP address, and/or other electronic address of the associated hardware (when the computational component is software). When administration of a computational component is completed, the licensed server assigns a specific certificate from the license file to the computational component.

Next, each valid computational component is configured with the IP address or other electronic address of the licensed server and appropriate authentication information to allow it to claim its unique certificate from the license file. Once configured, a given computational component makes a license request to the licensed server to enable the licensed software. Once the software is enabled, the computational component makes a certificate request to the licensed server. In response to the certificate request, the licensed server authenticates the computational component (using the information previously administered on the licensed server) and returns the assigned certificate and encrypted private key to the computational component. The certificate request and response can be carried over a secure link, such as SSL, to protect the authentication and certificate information. When the certificate and encrypted private key have been transferred from the licensed server to the computational component, the computational component installs the certificate and decrypts the private key. The computational component has the appropriate key for this decryption built into the software and secured against hackers using the scatter-gather method or other techniques.

From the foregoing, it can be seen that this configuration of the present invention includes at least the following features:

(a) only valid computational components as established by the enterprise can obtain a certificate;

(b) each valid computational component is assigned a specific certificate from the license file;

(c) to avoid the private keys from being compromised, they are encrypted in the license file when the license file is transmitted over the network;

(d) the encryption key used to protect the private key is built into the licensed server (either in firmware or software) so that only the licensed server can be used to obtain the private key;

(e) the licensed server will only decrypt the private key if a valid license has been granted, thereby preventing pirated software from being used to discover private keys;

(f) certificates include the enterprise customer's license ID number to allow identification of computational components with certificates from outside the enterprise network;

(g) because the present invention includes or appends a certificate and private key in or to a license file before the license is installed on a computational component, the certificate and private key can be generated and provided to a computational component even before the computational component is assigned an electronic address; and (h) because the manufacture and/or provider is the issuing authority, the certificate creation and validation process does not require the involvement of a recognized issuing authority, such as Verisign, thereby avoiding substantial costs and delays in provisioning computational components.

In a further embodiment of the present invention, the system could be used to provide secure and unique certificate distribution from a common file without the licensing portions.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Overview of the Remote Feature Activation System

Figure 1:
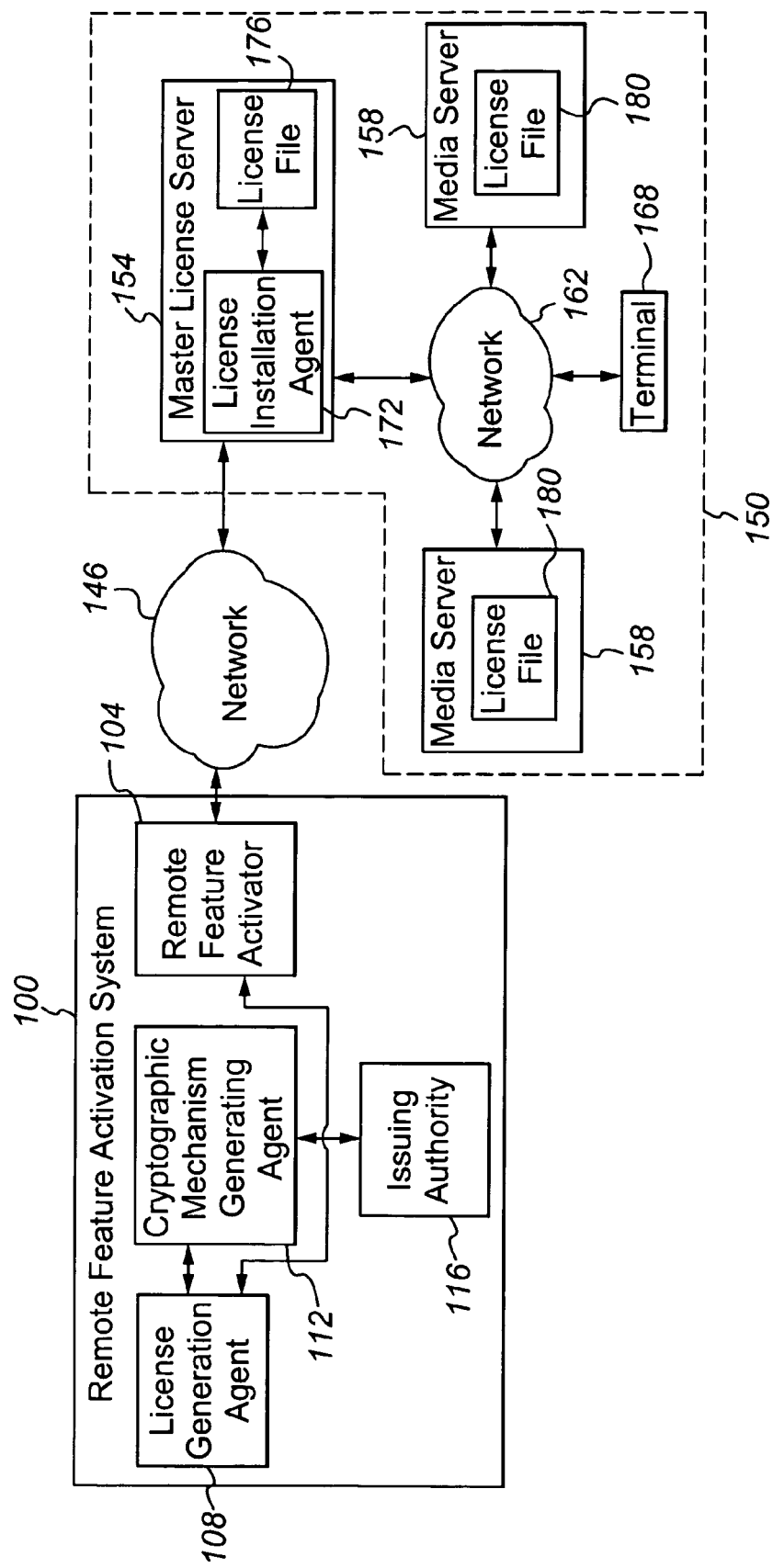
FIG. 1 is a block diagram of a licensing architecture according to an embodiment of the present invention.

Referring to FIG. 1, the remote feature activation or RFA system 100 comprises a remote feature activator 104 to supervise creation, encryption and delivery of master license files to primary media servers, a license generation agent 108 that generates standard license files in response to requests from the RFA system 104, an issuing authority 116 (which is typically a crypto-accelerator or smart card) to digitally sign certificates included in requests for media server certificates, and a cryptographic mechanism generating agent 112 (which is usually a daemon) that generates and queues (in advance) public/private key pairs and generates and forwards requests for media server certificates.

The RFA system 100 is in communication, with an Enterprise Resource Manager or ERM (not shown) and databases (not shown). The operation of the ERM is discussed in detail in copending U.S. application Ser. No. 10/232,507 entitled "License File Serial Number Tracking." The ERM is configured to cause the addition, update, modification, and validation of entries in the databases based on predetermined rules or policies. The database comprises a plurality of records corresponding to hardware (e.g., processors or IP services interface cards) sold to customers. In particular, the database typically includes a serial number, serial number status or licensing state, client or purchaser, material code(s) (e.g., a material code in SAP that defines the hardware having the serial number), an Enterprise System ID or ESID that identifies uniquely the enterprise that is the subject of the record, a Module ID or MID that identifies a module in the associated enterprise record, and a System ID that identifies uniquely a system in the associated enterprise record. A selected media server is identified uniquely by the combination of the SID and MID. The database further comprises a plurality of records associated with hardware and software corresponding to each customer order. Each order entry typically includes an order number, customer name, address, and contact information, and a series of quantity, material code, and description fields identifying the contents of each order. The databases and data structures are further described in copending U.S. patent application Ser. No. 10/232,906, filed Aug. 30, 2002, entitled "Remote Feature Activator Feature Extraction".

The RFA system 100 is further in communication, via network 146, with an enterprise network 150. The enterprise network 150 includes a master license server 154 and media servers 158, a network 162, and a terminal 168.

The media servers 158 can be any converged architecture for directing circuit-switched and/or packet-switched contacts to one or more communication devices. Typically, the media server is a stored-program-controlled system that conventionally includes interfaces to external communication links, a communications switching fabric, service circuits (e.g., tone detectors and generators, announcement circuits, etc.), memory for storing control programs and data, and a processor (i.e., a computer) for executing the stored control programs to control the interfaces and the fabric and to provide automatic contact-distribution functionality. Illustratively, the media server can be a modified form of Avaya Inc.'s Definity™ Private-Branch Exchange (PBX)-based ACD system; Avaya Inc.'s IP600™ LAN-based ACD system, or an S8100™, S8300™, S8500™, S8700™, or S8710™ media server running a modified version of Avaya, Inc.'s Communication Manager™ voice-application software with call processing capabilities and contact center functions. Other types of known switches and servers are well known in the art and therefore not described in detail herein. The media servers 158 can serve a variety of functions, including acting as main server, Local Spare Processors or LSPs, WAN spare processor, or PPN, and Enterprise Survivable Server or ESS.

The master license server 154 can be any system operable to install and distribute licenses. Typically, the master license server 154 is a media server having network connectivity to the remote feature activation system 100.

The terminal 168 is a computer, such as a laptop or PC, that is connected to the media servers for user administration of the various system elements in the enterprise network. Administration includes the creation and distribution of allocation licenses as discussed more fully below.

Typically, networks 120 and 162 are local area networks while network 146 is a wide area network, such as the Internet.

The master license server 154 includes a license installation agent 172 that generates and forwards license files 180 to media servers. The license files typically include or are attached to a certificate and corresponding private key for the corresponding media server. The master license file 176 is generated and distributed by the remote feature activation system 100 and the server license files 180 by the master license server 154. Because the license file is not associated with a single media server, the enterprise has portability of the capacities between all the media servers in the enterprise. The agent 172 confirms that the sum of allocations among all of the enterprise media server license files 180 does not exceed the limits set forth in the master license file 176.

As will be appreciated, during the generation and transmission of licenses to the various servers 158 and later communications between and among the servers 154 and/or 158 and with the RFA system 100, it is important to provide adequate security to prevent spoofing and other security breaches. In a preferred embodiment of the present invention, PM and SSL or TSL are employed to provide the security. This, of course, requires each of the master license server 154 and other media servers 158 to have digital certificates and public/private key pairs. The provision of digital certificates and public/private key pairs is effected by the RFA system 100 during master license file 176 installation in the master license server 154. The provision of digital certificates and public/private key pairs to the various media servers 158 can be effected by including in the master license file 176 a plurality of certificates and key pairs, one for each of the media servers and/or by using a smart card or dongle as described in copending U.S. application Ser. No. 10/947,418, entitled "Secure Installation Activation".

Other aspects of the architecture are described in the copending applications referenced above and incorporated herein by this reference.

The Master License File

Figure 2:
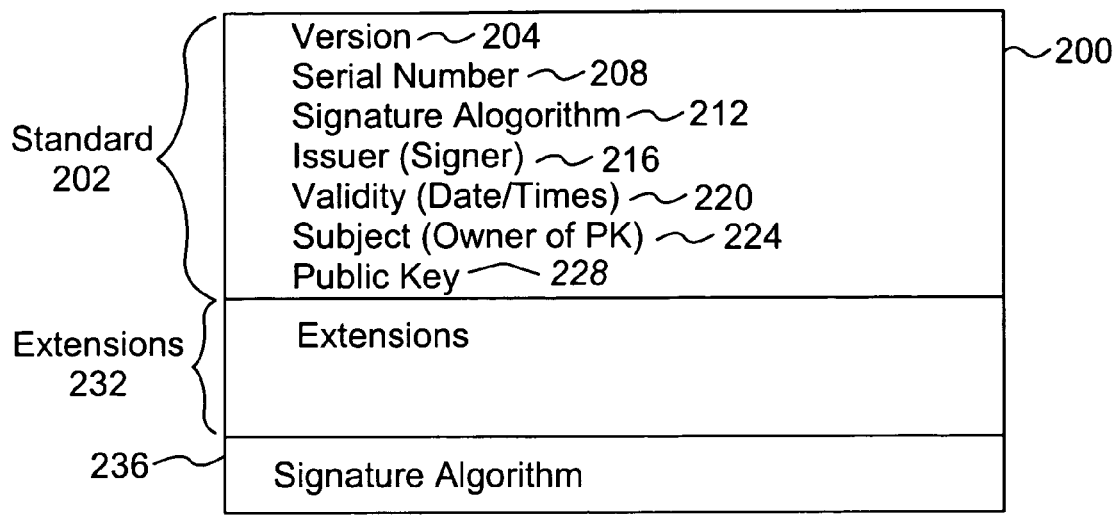
FIG. 2 depicts the format of a digital certificate.
Figure 3:
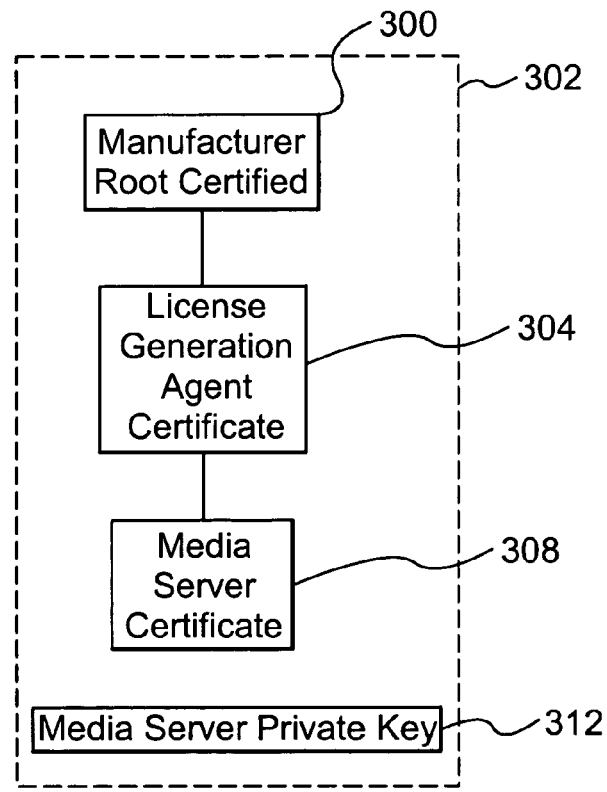
FIG. 3 depicts a chain of trust according to an embodiment of the present invention.

Prior to discussing the process for providing a digital certificate and public/private key pair to the master license server 154, the PKI information included and not included in the master license file 176 will be discussed. The license file, in addition to the license terms and related information such as licensed feature and capacity codes, the serial numbers of licensed hardware devices, and the like, includes at least one (if not all) of the various digital certificates in the chain of trust and the unique private key assigned to the master license server 154 as well as the PKI information for each of the media servers 158. With reference to FIG. 3, the chain of trust is depicted. The manufacturer root certificate 300 is at the top of the chain. As noted, the root certificate is both issued to and signed by the private key of the manufacturer and/or supplier of the licensed software and/or hardware. The license generation agent or issuing authority certificate 304 is issued to the RFA system 100 and signed with the private key of the manufacturer and/or supplier. Finally, a different media server certificate 308 is issued to each media server and is signed with the private key of the RFA system 100. With further reference to FIG. 2, the PKI information 302 includes an encoded copy of the corresponding media server's private key 312.

The certificate 308 for the master license server includes a variety of information. For example, it includes the name of the licensed product and the ESID associated with the corresponding media server. The expiration date of the certificate is typically the expiration date of the enterprise wide license. The certificate 308 will commonly not have an IP address or domain name as part of its subject field. The reason is that, for this to be possible, the media server would have to be installed and assigned a name in the enterprise network. Then a certificate request would have to be generated and transmitted to the RFA system 100 for signing. Then the final certificate would have to be downloaded and installed on the server. This would delay unnecessarily and significantly the installation of servers.

Process for Generating and Installing Master License Files

Figure 4:
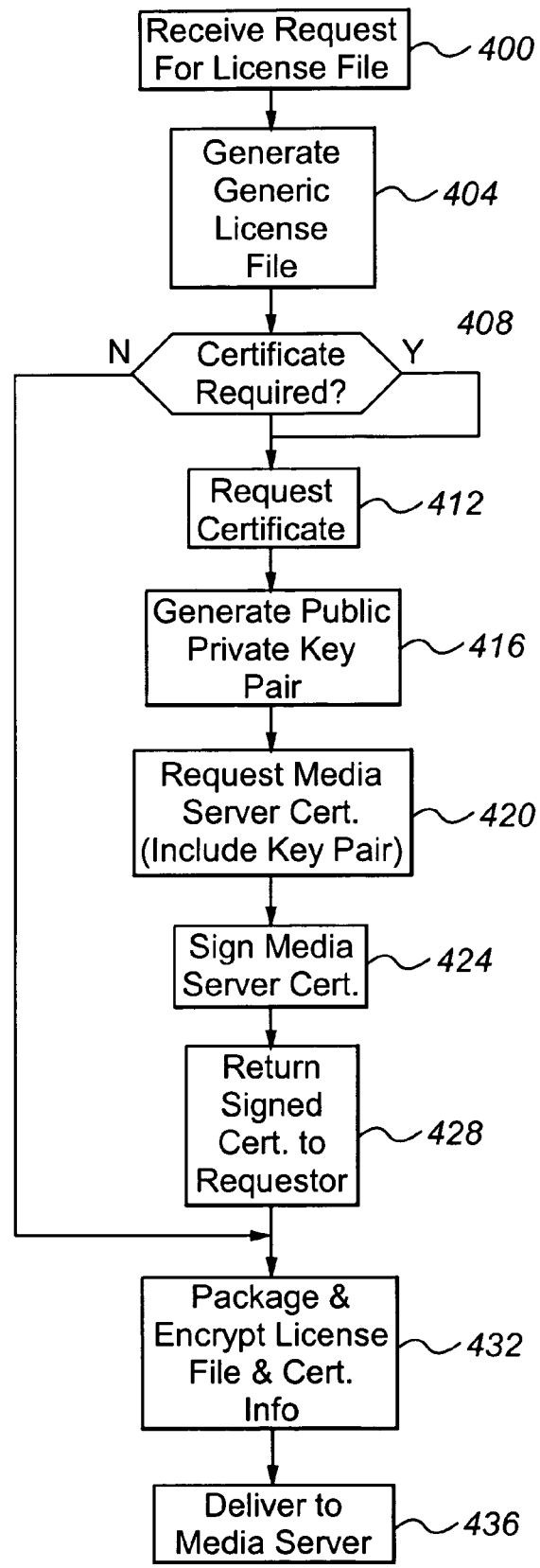
FIG. 4 is a flowchart depicting a license generation process according to an embodiment of the present invention.

With reference to FIG. 4, in step 400 the remote feature activator 104 receives a request for a master license file. The activator 104 forwards a license file generation request to the license generation agent 108. In step 404, the agent 108 retrieves records for the pertinent enterprise from the remote feature activator 104 and generates a license file. During the generation process, the agent 108 determines in decision diamond 408 whether the product release and platform type defined in the generic license input file requires a media server certificate. If not, the RFA system 100 proceeds to step 432 (discussed below). If so, the agent 108 forwards in step 412 a request for a certificate to the cryptographic mechanism generating agent 112. The certificate request includes one or more media server certificate(s) (in X509V3 format) populated using information from the generic license file. The certificate(s) are unsigned and do not include the corresponding media server's public key (which has not yet been assigned).

In step 416, the agent 112 generates a public/private key pair (which is preferably done using RSA) to be assigned to each of the media servers. The generation is made using open SSL library calls. For performance reasons, the agent 112 preferably generates key pairs in advance and queues them for assignment as requests are received. The corresponding public key is included in the unsigned media server certificate(s) and in step 420 is forwarded to the issuing authority 116 in a signature request for the media server certificate.

In step 424, the issuing authority 116 signs the media certificate(s) with its private key and in step 428 returns the signed certificate(s) to the agent 112. The agent 112 forwards the signed certificate(s), assigned private key(s) and license generation agent certificate 304 to the activator 104.

In step 432, the enterprise wide or master license 176 is generated from the generic license file, the signed certificate, assigned master license server private key and license generation agent certificate 304. The manufacturer root certificate 300 may be included in the license file before transmission or may be built in the licensed software. During step 432, the private key is encrypted with a first encryption algorithm and the entire license file with a second different encryption algorithm. The first and second encryption algorithms each use a secret key as is used in symmetric encryption and as further described in U.S. patent application Ser. No. 10/348,107, filed Jan. 20, 2003, entitled "Remote Feature Activation Authentication File System."

In step 436, the encrypted master license file 176 is delivered to the master license server 154.

Figure 5:
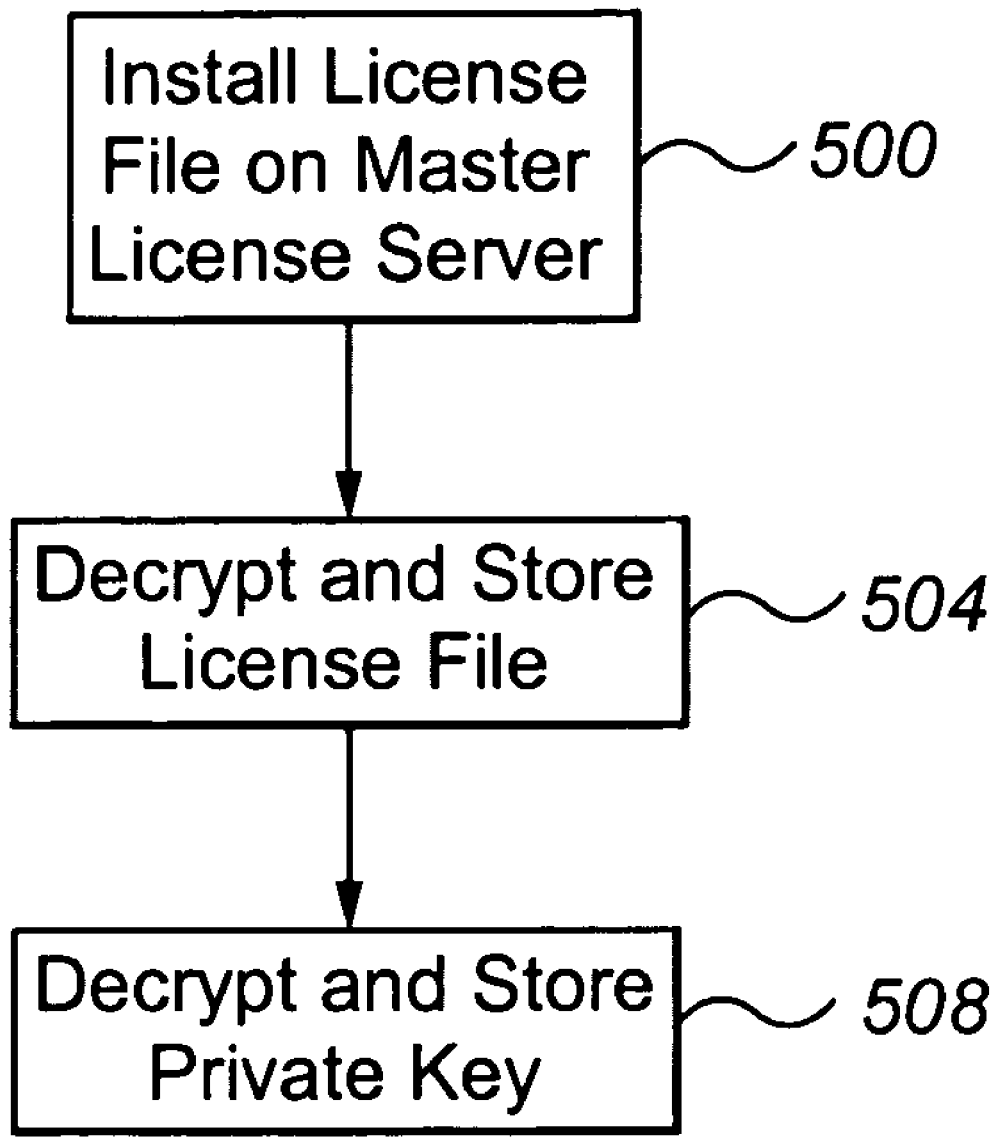
FIG. 5 is a flowchart depicting a license installation process according to another embodiment of the present invention.

Referring to FIG. 5, the license file 176 is received by the license installation and configuration agent 172 and installed in step 500. In step 504, the file 176 is decrypted using the second encryption algorithm and stored in a first location. In step 508, the appropriate certificate is extracted from the license file 176, validated against the manufacturer's root certificate 300 (which is already on the server), and the root certificate 300 appended to the chain of trust. The PKI information (minus the private key) is stored in a second different location. Finally, the private key is decrypted using the first encryption algorithm and stored in a third different location.

A number of variations and modifications of the invention can be used. It would be possible to provide for some features of the invention without providing others.

For example in one alternative embodiment, the various modules referenced herein are implemented as software, hardware (e.g., a logic circuit), or a combination thereof.

In another alternative embodiment, the division of the various functions performed by the various modules described above are different.

In another embodiment, the primary media server certificate is a signing certificate and is used to sign certificate for the media servers. In this manner, the certificates do not need to be provided by the RFA system 100.

In another embodiment, the license distributed by the remote feature activation system 100 includes only the private key and not the digital certificate(s). Digital certificate requests can be generated by the master license server 154 and/or media servers 158 including enterprise-specific and/or device-specific information. The remote feature activation system 100 can use the various private key(s) issued to the identified enterprise to authenticate the certificate request. The request can then be signed by the appropriate certificate authority and returned to the enterprise network 150 for distribution to the appropriate server 154 or 158.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A process for licensing a computational component in a distributed processing network, the computational component to be licensed being remote from the license provider, comprising:
   the licensing provider assigning, with the cooperation of a processor, a private and public key pair to the computational component;
   the licensing provider creating a license file to be installed on the computational component;
   the licensing provider incorporating the private key in the license file; and
   the licensing provider thereafter transmitting the license file, the license file including the computational component's private key, to the computational component, wherein the license file also includes an indication of a maximum number of computational components, and this maximum number corresponds to a number of certificates in the license file.

2. The method of claim 1, further comprising:
   the licensing provider creating a digital certificate for the computational component, the digital certificate being signed with a private key of the licensing provider, the licensing provider's private key being different from the computational component's private key; and
   the licensing provider transmitting, at least substantially simultaneously, the license file, the computational component's signed digital certificate, and private key to the computational component.

3. The method of claim 2, wherein the license file includes the computational component's signed digital certificate and private key, wherein an expiration date of the certificate is the same as an expiration date of the license, and wherein the certificate is generated before the licensing provider is aware of the computational component's electronic address.

4. The method of claim 3, wherein the private key is encrypted with a first cryptographic algorithm and included in the license file in encrypted form and wherein the encrypted private key and license file are encrypted, before transmission, with a different second cryptographic algorithm and transmitted in encrypted form.

5. The method of claim 4, wherein the first and second cryptographic algorithms use symmetric encryption and wherein the first secret key used by the first cryptographic algorithm and the second key used by the second cryptographic algorithm are stored in the computational component before the computational component receives the license file.

6. The method of claim 4, further comprising:
   the computational component determining whether the license file is valid; and
   when the license file is valid, the computational component decrypting the private key using the first encryption algorithm; and
   when the license file is invalid, the computational component not decrypting the private key using the first encryption algorithm, wherein the license file is stored by the computational component in a first location in memory different from a second location in memory containing the private key.

7. The method of claim 2, wherein the licensing provider is the issuing authority, wherein the root certificate is issued and signed by the licensing provider, and wherein the computational component's digital certificate comprises a license identifier to allow identification of the computational component.

8. The method of claim 2, wherein the computational component is a first media server and is part of an enterprise network, the enterprise network comprising at least a second media server that is remote from the licensing provider and the first media server, and wherein the license file comprises a first digital certificate for the first media server and a different second digital certificate for the second media server and further comprising:
   the first media server receiving authentication information corresponding to the second media server;
   the first media server receiving a certificate request from the second media server;
   the first media server authenticating the second media server; and
   when the authentication is successful, the first media server providing the second digital certificate to the second media server.

9. The method of claim 2, wherein the license file comprises the computational component's signed digital certificate and wherein a first encryption key for the first encryption algorithm is incorporated, by the licensing provider, in the computational component before the computational component is provided by the licensing provider to an enterprise.

10. The method of claim 2, wherein the license file, the computational component's signed digital certificate, and private key are installed on the computational component at least substantially simultaneously and wherein the signed digital certificate excludes an electronic address associated with the computational component.

11. The method of claim 1, wherein the computational component is a first media server and is part of an enterprise network, the enterprise network comprising at least a second media server that is remote from the licensing provider and the first media server, and further comprising:

the first media server establishing a secure session with the second media server using at least the first media server's certificate;

the first media server creating a license file providing the second media server with a portion of at least one of a feature and capacity licensed to the enterprise by the license provider; and the first media server providing the license file to the second media server.

12. The method of claim 11, wherein the license file provided by the licensing provider and the license file provided by the first media server are different and wherein a digital certificate and the public key of the second media server are included in the license file provided by the license provider.

13. A computer readable medium comprising processor executable instructions for performing the steps of claim 1.

14. A system for licensing a computational component in a distributed processing network, comprising:

a remote feature activation system that is spatially remote from the computational component and comprises a cryptographic mechanism generating agent, the cryptographic mechanism generating agent, with the cooperation of a logic circuit, being operable to: (a) assign a private and public key pair to the computational component; (b) create a digital certificate for the computational component, the digital certificate being signed with a private key of the cryptographic mechanism generating agent, the cryptographic mechanism generating agent's private key being different from a computational component's private key; (c) create a license file to be installed on the computational component; (d) incorporate the private key of the computational component in the license file for delivery with the license file; and (e) transmit the license file, including the private key of the computational component, and the computational component's signed digital certificate to the computational component, wherein the license file also includes an indication of a maximum number of computational components, and this maximum number corresponds to a number of certificates in the license file.

15. The system of claim 14, wherein the license file includes the computational component's signed digital certificate and wherein an expiration date of the certificate is the same as an expiration date of the license.

16. The system of claim 15, wherein the private key is encrypted with a first cryptographic algorithm and included in the license file in encrypted form and wherein the encrypted private key and license file are encrypted, before transmission, with a different second cryptographic algorithm and transmitted in encrypted form.

17. The system of claim 16, wherein a first encryption key for the first encryption algorithm is incorporated, by the remote feature activation system, in the computational component before the computational component is provided by the cryptographic mechanism generating agent to an enterprise.

18. The system of claim 14, wherein the remote feature activation system is the issuing authority, wherein the root certificate is issued and signed by the remote feature activation system, and wherein the computational component's digital certificate comprises a license identifier to allow identification of the computational component.

19. The system of claim 14, wherein the computational component is a first media server and is part of an enterprise network, the enterprise network comprising at least a second media server that is remote from the remote feature activation system and the first media server, and wherein the first media server is operable to: (a) establish a secure session with the second media server using at least the first media server's certificate; (b) create an allocation license file providing the second media server with a portion of at least one of a feature and capacity licensed to the enterprise by the license provider; and (c) provide the allocation license file to the second media server.

20. The system of claim 19, wherein the license file provided by the remote feature activation system and the allocation license file are different and wherein a digital certificate and public key of the second media server are not included in the license file provided by the license provider.

21. The system of claim 14, wherein the license file, the computational component's signed digital certificate, and private key are transmitted to the computational component at least substantially simultaneously.

22. The system of claim 14, wherein the license file, the computational component's signed digital certificate, and private key are installed on the computational component at least substantially simultaneously and wherein the signed digital certificate excludes an electronic address associated with the computational component.

23. The system of claim 14, wherein the computational component stores the license file in a first memory location different from a second memory location containing the private key.

24. A method, comprising:

assigning, by a manufacturer of a computational component, a private and public key pair to the computational component, the computational component now being located in an enterprise network of a purchaser of the computational component;

creating, by the manufacturer, a license file to be installed on the computational component;

transmitting, by the manufacturer, over an untrusted network, and to the enterprise network, the license file and private key, the private key being encrypted with a first encryption key associated with a first encryption algorithm, wherein the license file also includes an indication of a maximum number of computational components, and this maximum number corresponds to a number of certificates in the license file.

25. The method of claim 24, wherein the license file includes the private key in the encrypted form, wherein the license file includes a digital certificate for the computational component, the digital certificate being signed with a private key of the manufacturer, the manufacturer's private key being different from the computational component's private key, and wherein the license file, encrypted private key, and digital certificate are encrypted with a second encryption key and second encryption algorithm, the first and second encryption keys and first and second encryption algorithms being different.

26. The method of claim 25, wherein an expiration date of the certificate is the same as an expiration date of the license and wherein the certificate is generated before a cryptographic mechanism generating agent associated with the manufacturer is aware of the computational component's electronic address.

27. The method of claim 25, wherein the first encryption key for the first encryption algorithm is incorporated, by the manufacturer, in the computational component before the computational component is provided by the manufacturer to an enterprise associated with the enterprise network, and further comprising:

the computational component determining whether the license file is valid; and when the license file is valid, the computational component decrypting the private key using the first encryption algorithm; and when the license file is invalid, the computational component not decrypting the private key using the first encryption algorithm, wherein the license file is stored by the computational component in a first location in memory different from a second location in memory containing the private key.

28. The method of claim 25, wherein the license file, the computational component's signed digital certificate, and private key are installed on the computational component at least substantially simultaneously and wherein the signed digital certificate excludes an electronic address associated with the computational component.

29. The method of claim 24, wherein the computational component is a first media server, wherein the enterprise network comprises at least a second media server that is remote from the manufacturer and the first media server, and wherein the license file comprises a first digital certificate for the first media server and a different second digital certificate for the second media server and further comprising:

the first media server receiving authentication information corresponding to the second media server;

the first media server receiving a certificate request from the second media server;

the first media server authenticating the second media server; and when the authentication is successful, the first media server providing the second digital certificate to the second media server.

30. A computer readable medium comprising processor executable instructions for performing the steps of claim 24.

* * * * *